US006789387B2

(12) United States Patent
Brinkman

(10) Patent No.: US 6,789,387 B2
(45) Date of Patent: Sep. 14, 2004

(54) SYSTEM FOR RECOVERING ENERGY IN HYDRAULIC CIRCUIT

(75) Inventor: Jason L. Brinkman, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 58 days.

(21) Appl. No.: 10/260,272

(22) Filed: Oct. 1, 2002

(65) Prior Publication Data

US 2004/0060430 A1 Apr. 1, 2004

(51) Int. Cl.[7] .................................................. F16D 31/02

(52) U.S. Cl. ............................ 60/414; 60/435; 60/445; 60/459

(58) Field of Search .......................... 60/413, 414, 435, 60/445, 459

(56) References Cited

U.S. PATENT DOCUMENTS 4,736,585 A * 4/1988 Kordak ........................ 60/459
4,819,429 A * 4/1989 Kordak ........................ 60/414
5,868,059 A 2/1999 Smith
6,151,894 A * 11/2000 Endo et al. .................. 60/414
6,378,301 B2 * 4/2002 Endo et al. .................. 60/414
6,502,393 B1 * 1/2003 Stephenson et al. .......... 60/414

FOREIGN PATENT DOCUMENTS

WO WO 00/00748 1/2000

* cited by examiner

*Primary Examiner*—Thomas E. Lazo
(74) *Attorney, Agent, or Firm*—Finnegan, Henderson, Farabow, Garrett & Dunner

(57) ABSTRACT

A method is provided for recovering energy in a hydraulic circuit. The hydraulic circuit includes a pump having a swashplate and being in fluid communication with a hydraulic actuator via a valve. The method includes sensing an overrunning load condition in the hydraulic circuit, actuating the valve to provide fluid from the hydraulic actuator to the pump under the overrunning load condition, and producing a torque output from the fluid provided to the pump. Also, a method is provided for recovering energy in a hydraulic circuit including a pump and a motor in fluid communication with a hydraulic actuator via a valve. The method includes sensing an overrunning load condition in the hydraulic circuit, actuating the valve to provide fluid from the hydraulic actuator to the motor under the overrunning load condition, and producing a torque output from the fluid provided to the motor.

43 Claims, 4 Drawing Sheets

SYSTEM FOR RECOVERING ENERGY IN HYDRAULIC CIRCUIT

TECHNICAL FIELD

The present invention is directed to a system and method for recovering energy in a hydraulic circuit. More particularly, the invention relates to a system and method for recovering energy in a hydraulic circuit.

BACKGROUND

In a machine, such as an excavator or a loader, a hydraulic circuit may include a variable displacement pump in fluid communication with a hydraulic actuator to handle a variable load. The pump provides pressurized fluid to the hydraulic actuator, such as a hydraulic cylinder, to lift the load. The actuator may be connected to an implement, such as a bucket.

When the load is lowered, the pressurized fluid in the hydraulic actuator is often discharged from the actuator to a reservoir. There is energy in discharging the pressurized fluid from the hydraulic actuator when lowering the load. However, many machines have no means of recovering the energy when the hydraulic actuator is retracted. Typically, these machines throttle the fluid through a valve to control a lowering or retracting speed of the actuator. This results in a loss or waste of energy and undesired heating of the hydraulic fluid.

The above situation can occur, for example, when a hydraulic cylinder is operated under an overrunning load. After a hydraulic cylinder has been extended to lift the load, the cylinder may retract by itself due to its own weight. This is often referred as an overrunning load condition. Overrunning load conditions can be readily observed during machine operation.

Some attempts have been made to recover this otherwise wasted energy in the hydraulic circuit. For example, WO 00/00748 discloses a system that recovers energy by providing an additional pump/motor with an over-center capability in the hydraulic circuit. The pump/motor transfers fluid between a lifting circuit and an accumulator for storing energy. However, such an accumulator increases the size of the machine. Also, when the lifting cylinder is dropped rapidly, a large quantity of fluid is discharged rapidly from the cylinder. To accommodate the fluid, the pump/motor needs to be large. The disclosed system also requires an additional charge pump and a valve to fluidly couple the pump/motor to the lifting cylinder. Such a charge pump is not energy efficient, and the additional components increase the cost of the machine system. The system has another shortcoming that when the lifting cylinder is being retracted and the accumulator is at a higher pressure than the fluid discharged from the lift cylinder, additional energy from the engine is required to store the energy coming from the lift cylinder.

Thus, it is desirable to provide an energy recovering system that is energy efficient and cost effective. The present invention is directed to solving one or more of the above-mentioned shortcomings.

SUMMARY OF THE INVENTION

In one aspect, a method is provided for recovering energy in a hydraulic circuit. The hydraulic circuit includes a pump having a swashplate and being in fluid communication with a hydraulic actuator via a valve. The method includes sensing an overrunning load condition in the hydraulic circuit, actuating the valve to provide fluid from the hydraulic actuator to the pump under the overrunning load condition, and producing a torque output from the fluid provided to the pump.

In another aspect, a system is provided for recovering energy in a hydraulic circuit. The system includes a pump having a swashplate tiltable to direct flow between a valve and a reservoir. A hydraulic actuator is provided in fluid communication with the pump via the valve and a conduit. The valve is configured to provide fluid from the hydraulic actuator to the pump under an overrunning load condition. A sensor assembly is provided in communication with the hydraulic circuit, and a control unit is electrically coupled to the valve and the sensor assembly.

In another aspect, a method is provided for recovering energy in a hydraulic circuit including a pump and a motor in fluid communication with a hydraulic actuator via a valve. The method includes sensing an overrunning load condition in the hydraulic circuit, actuating the valve to provide fluid from the hydraulic actuator to the motor under the overrunning load condition, and producing a torque output from the fluid provided to the motor.

In another aspect, a system is provided for recovering energy in a hydraulic circuit. The system including a pump and a hydraulic actuator in fluid communication with the pump via a valve and a conduit. A motor is provided in fluid communication with the hydraulic actuator via the valve. The valve is configured to provide fluid from the hydraulic actuator to the motor under an overrunning load condition. A sensor assembly is provided in communication with the hydraulic circuit, and a control unit is electrically coupled to the valve and the sensor assembly.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
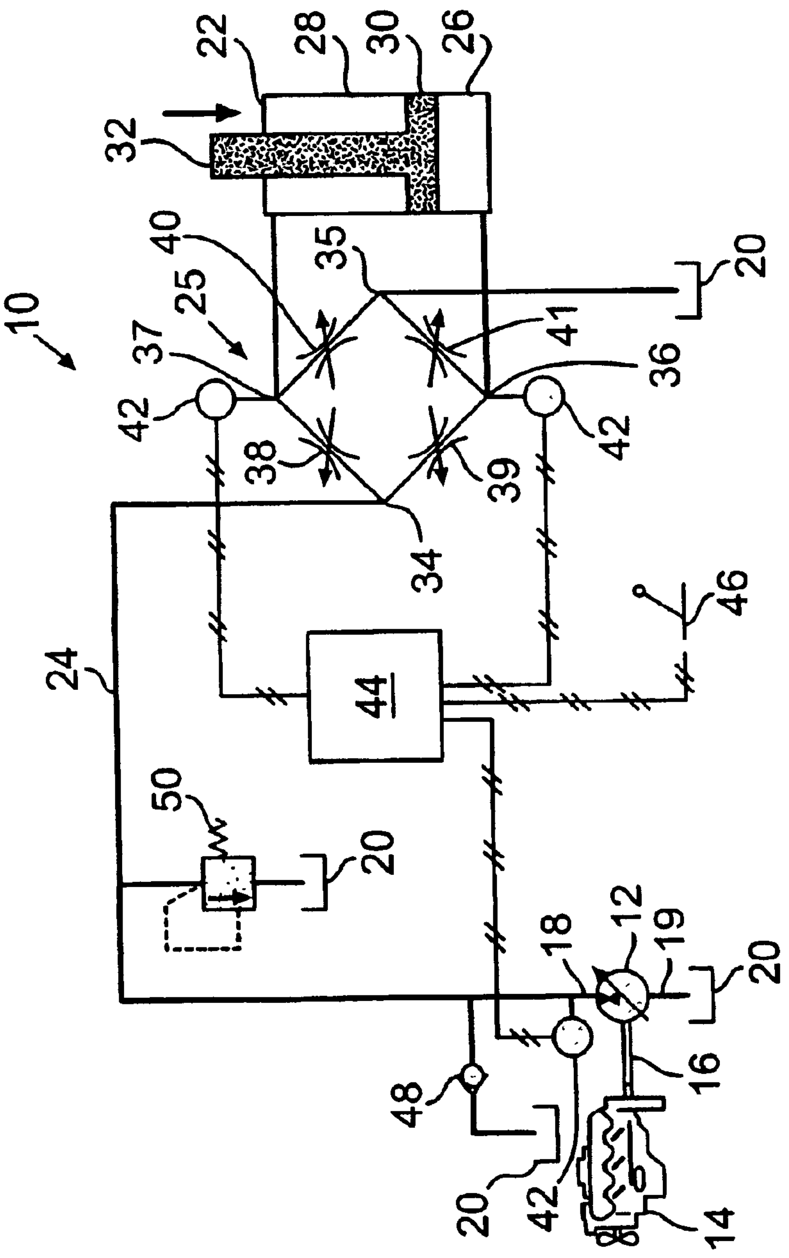
FIG. 1 is a schematic and diagrammatic representation of a system for recovering energy according to one exemplary embodiment of the present invention.

With respect to FIG. 1, an energy recovering system 10 may be a part of an excavator, a loader, or any other piece of equipment utilizing a hydraulic system. The system 10 includes a pump 12 typically driven by a power source 14, such as an internal combustion engine, via a drive train or shaft 16. In an exemplary embodiment, the pump 12 has a variable displacement capability and can vary its displacement between minimum and maximum displacement positions.

A variable displacement pump generally includes a drive shaft, a rotatable cylinder barrel having multiple piston bores, pistons held against a tiltable swashplate, and a valve plate. When the swashplate is tilted relative to the longitudinal axis of the drive shaft, the pistons reciprocate within the piston bores to produce a pumping action and discharge the pressurized fluid to an outlet port. When the swashplate is positioned at the center and is not tilted, the pistons do not reciprocate and the pump does not produce any discharge pressure.

Some variable displacement pumps have a capability to function when the swashplate is tilted in the opposite direction relative to the longitudinal axis of the drive shaft. Such a swashplate position is often referred to as an "over-center" position. When the swashplate is tilted to the over-center position, the fluid flows from the outlet port to the inlet port. With sufficient fluid flow and pressure differential between the outlet and inlet ports, the pistons in the pump reciprocate within the piston bores and produce a pumping action. The pumping action by the pistons rotates the cylinder barrel and the drive shaft, thereby providing a motor torque output when the fluid pressure at the outlet port is higher than the inlet port. A variable displacement pump can, therefore, function as both a pump and a motor depending on the tilt angle of the swashplate and the pressure differential between the inlet and outlet ports.

The pump 12 includes a rotatable cylinder barrel having multiple piston bores (not shown), a tiltable swashplate (not shown), pistons (not shown) held against the tiltable swashplate, and an outlet port 18 and an inlet port 19. The swashplate is tilted relative to the longitudinal axis of the drive shaft 16, and the pistons reciprocate within the piston bores to produce a pumping action. When the swashplate is tilted to the normal position, the pump 12 functions as a pump. On the other hand, when the swashplate is tilted to the over-center position, the pump 12 functions as a motor with pressure differential between the outlet and inlet ports 18, 19. The pump 12 may also have a swashplate angle sensor (not shown) to sense a tilt angle of the swashplate. The pump 12 may be in fluid communication with a reservoir 20 through the inlet port 19. One skilled in the art appreciates the basic structure of a variable displacement pump, and the structure will not be described or shown in detail.

The system 10 also includes a hydraulic actuator in fluid communication with the pump 12 via a conduit 24 and a valve 25. Though the hydraulic actuator in this embodiment is a hydraulic cylinder 22, other actuators may be utilized. In the exemplary embodiment shown in FIG. 1, the hydraulic cylinder 22 is a double-acting cylinder. The double-acting cylinder 22 has a pair of actuating chambers, namely a head end actuating chamber 26 and a rod end actuating chamber 28. The head end chamber 26 and the rod end chamber 28 are separated by a piston 30 having a piston rod 32. The cylinder 22 may also include a cylinder position sensor (not shown) to sense the position of the piston 30 in the cylinder 22.

During a non-overrunning load condition, the pressurized fluid is supplied from the pump 12 (acting as a pump) to the hydraulic cylinder 22 through the conduit 24. Under an overrunning load condition, the pressurized fluid is returned from the hydraulic cylinder 22 to the pump 12 through the conduit 24.

The system 10 may include a flow control circuit, such as the valve 25. In the embodiment shown in FIG. 1, the valve 25 is an independent metering valve (IMV) assembly. The IMV has a pump port 34, a reservoir port 35, a cylinder head end port 36, and a cylinder rod end port 37. The IMV also includes four independently operable valves, 38, 39, 40, 41. A first independently operable valve 38 is disposed between the pump port 34 and the cylinder rod end port 37, and a second independently operable valve 39 is disposed between the pump port 34 and the cylinder head end port 36. A third independently operable valve 40 is disposed between the reservoir port 35 and the cylinder rod end port 37, and a fourth independently operable valve 41 is disposed between the reservoir port 35 and the cylinder head end port 36. These independently operable valves may be proportional valves that can vary fluid flow through the valves based on load requirements. Each of the independently operable valves can be controlled by corresponding solenoids (not shown) based on an operator command.

The system 10 may also include a sensor assembly in communication with the hydraulic circuit. As shown in the embodiment of FIG. 1, the sensor assembly may include a plurality of pressure sensors 42 that monitor the pressures of the hydraulic cylinder 22 and the conduit 24. The pressure sensors 42 can monitor head end and rod end actuating chamber pressures of the hydraulic cylinder 22, and the pressures in the conduit 24. While FIG. 1 illustrates the sensors located at the cylinder head end port 36 and the cylinder rod end port 37 of the IMV and in the conduit 24 near the pump 12, the location of the sensors 42 is not limited to that specific arrangement. The sensors 42 can be placed at any location suitable to monitor a desired actuator condition. One skilled in the art will appreciate that any sensor assembly capable of ascertaining a desired actuator condition of the hydraulic actuator may be utilized.

In the exemplary embodiment, the system 10 includes a control unit 44 electrically coupled to the valves and the sensor assembly (the connection between the control unit and the valves not shown in FIG. 1). The control unit 44 may also be coupled to the pump 12 and the power source 14. The control unit 44 receives an operator command through an actuator lever 46. The control unit 44 may be electrically connected solenoids and sensors, including the pressure sensors 42 and other sensors, to control the operation of the system 10. Based on the operating command and the monitored pressure of the hydraulic cylinder 22, the control unit 44 may determine whether the hydraulic circuit is operating under the overrunning condition.

As illustrated in FIG. 1, the system 10 may also include a check valve 48 in fluid communication with the conduit 24 and the reservoir 20 to supply fluid from the reservoir 20 to the conduit 24 when fluid pressure in the conduit 24 is less than reservoir pressure. The check valve 48, however, does not pass the fluid from the conduit 24 to the reservoir 20.

The system 10 may also include a relief valve 50 as a safety device. When the pressure in the conduit 24 rises to a undesirably high level, the relief valve 50 may open to discharge fluid in the conduit 24 to the reservoir 20 to avoid system failure.

Figure 2:
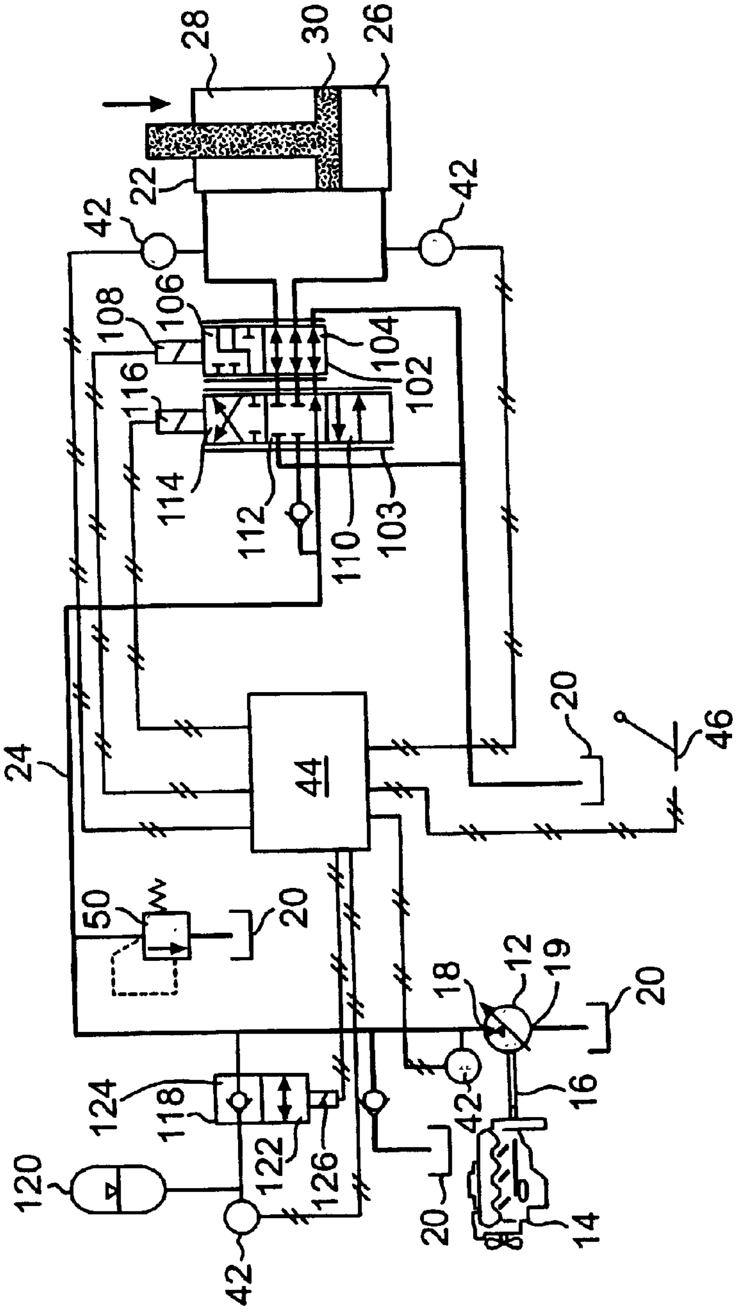
FIG. 2 is a schematic and diagrammatic representation of a system for recovering energy according to another exemplary embodiment of the present invention.

FIG. 2 is a schematic representation of a machine having a system for recovering energy according to another exemplary embodiment of the invention. The system 100 illustrated in FIG. 2 includes similar elements described for the system 10 in FIG. 1. The system 100 includes the hydraulic cylinder 22 in fluid communication with the pump 12 via the conduit 24 and a first valve 102 and a second valve 103. In this exemplary embodiment, the first valve 102 is a proportional solenoid valve having first and second valve positions, 104, 106. In the first valve position 104, the first valve 102 provides an independent fluid flow path for each of the head end and rod end actuating chambers 26, 28 of the hydraulic cylinder 22. On the other hand, the first valve 102 provides a combined fluid flow path for the head end and rod end actuating chambers 26, 28 in the second valve position 106. The valve positions can be changed by a solenoid 108 electrically coupled to the control unit 44.

The second valve 103 may be a proportional solenoid valve having first, second, and third valve positions, 110, 112, 114, respectively. In the first valve position 110, the second valve 103 can provide independent paths to each of the head end and rod end actuating chambers 26, 28. In the second valve position 112, the second valve 103 provides a single fluid path. In the third valve position 114, the second valve 103 provides independent paths to each of the head end and rod end actuating chambers 26, 28, which are opposite of the first valve position 110. The desired valve position of the second valve 103 can be selected by actuating a solenoid 116 electrically coupled to the control unit 44.

The system 100 may also include a supply valve 118 in fluid communication with the conduit 24 and an accumulator 120. The supply valve 118 may be a proportional valve having first and second valve positions, 122, 124. In the first valve position 122, the supply valve 118 allows the fluid from the conduit 24 to be supplied to the accumulator 120. The second valve position 124 may be provided with a check valve, and in the second valve position 124, the supply valve 118 may supply the fluid in the accumulator 120 to the conduit 24, but not from the conduit 24 to the accumulator 120. The supply valve 118 may have a solenoid 126 electrically coupled to the control unit 44 to change its valve positions.

The sensor assembly of FIG. 2 may include another pressure sensor 42 disposed adjacent to the accumulator 120 to monitor pressure of the fluid stored in the accumulator 120. The pressure sensor 42 may be electrically coupled to the control unit 44.

Figure 3:
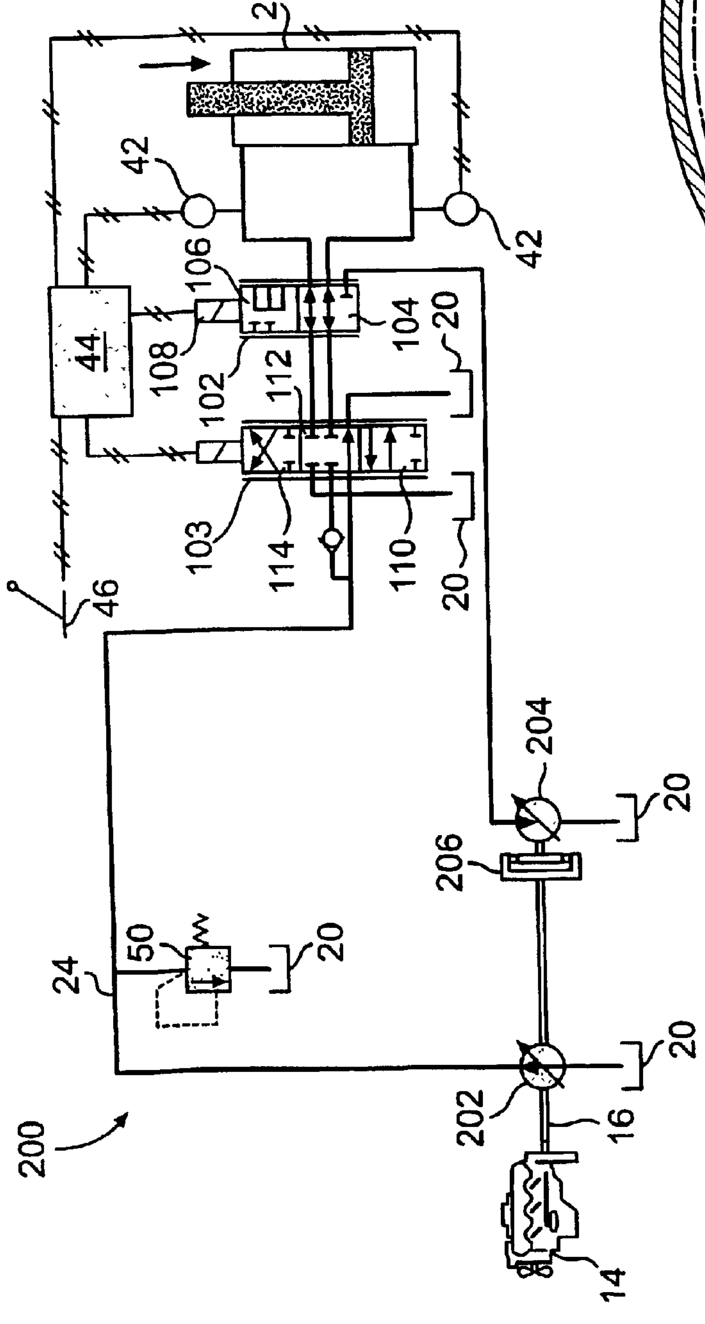
FIG. 3 is a schematic and diagrammatic representation of a system for recovering energy according to yet another exemplary embodiment of the present invention.

FIG. 3 is a schematic representation of a machine having a system for recovering energy according to another exemplary embodiment of the invention. The system 200 includes a pump 202, a hydraulic cylinder 22 in fluid communication with the pump 202 via a first valve 102, a second valve 103 and a conduit 24. In this exemplary embodiment, the pump 202 is a variable displacement pump driven by a power source 14 via a drive shaft 16.

As shown in FIG. 3, the system 200 includes a motor 204 in fluid communication with the hydraulic cylinder 22 via the first valve 102. The motor 204 may be a variable displacement motor configured to be coupled to the power source 14 via the shaft 16 or a different shaft. In the exemplary embodiment shown in FIG. 3, the motor 204 is configured to be coupled to the power source 14 via a one-way clutch 206.

Figure 4:
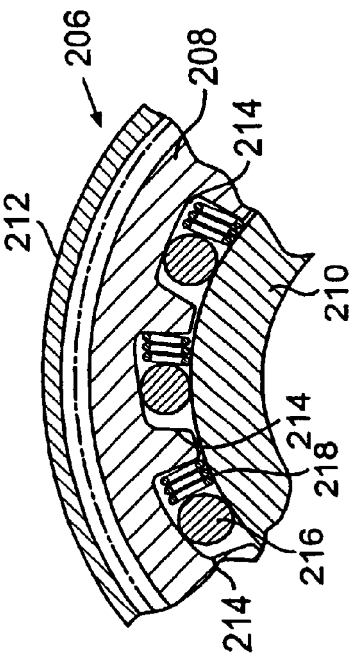
FIG. 4 is a partial cross-sectional view of a one-way clutch assembly in the system of FIG. 3.

FIG. 4 partially illustrates the cross sectional view of the one-way clutch 206 in detail. The one-way clutch 206 may include a first rotatable clutch element 208 coupled to the power source 14, a second rotatable clutch element 210 coupled to the motor 204, and a housing 212. As shown in FIG. 4, the first rotatable clutch element 208 has a plurality of recesses 214 on the surface facing the second rotatable clutch element 210. Each of the recesses 214 has a trapezoidal shape having different side depths. A bearing 216 and a spring 218 biasing the bearing 216 are provided in each of the recesses 214. The first and second rotatable clutch elements 208, 210, engage when the second rotatable clutch element 210 tries to rotate faster in the counter-clockwise (as shown in FIG. 4) than the first rotatable clutch element 208, thereby driving the first element. On the other hand, the first and second rotatable clutch elements 208, 210 disengage when the second rotatable clutch element 210 rotates slower in the counter-clockwise (as shown in FIG. 4) than the first rotatable clutch element 208.

Industrial Applicability

Figure 5A:
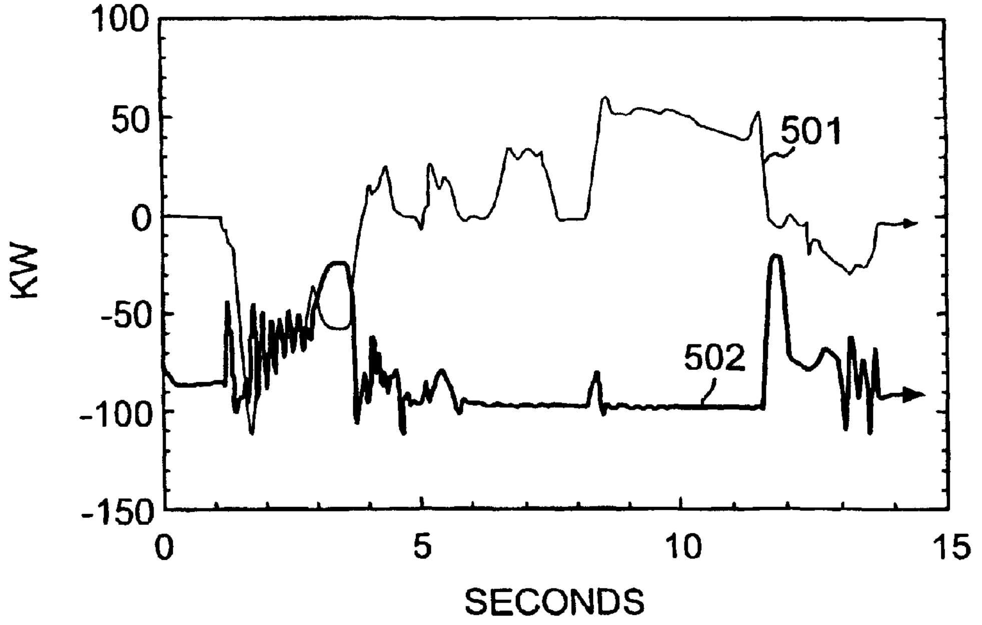
FIG. 5A is a graphical representation of an actuator power output and an engine power output during a simulated operation of a work machine.

FIG. 5A graphically illustrates an actuator power output and an engine power output in kW with respect to time during a simulated operation of a machine, such as, for example, a loader. The actuator power output is plotted as a trace 501, and the engine power output is plotted as a trace 502. When the trace 501, the actuator power output, is positive, energy is supplied to the actuator. When the trace 501 is negative, an overrunning load condition is occurring, and there is energy coming back into the system from the actuator. The trace 502 is always negative to indicate that the engine is always outputting power during the operation. As shown in FIG. 5A, the engine keeps outputting power to other systems, such as a drive train, in the machine even when the actuator power output is under the overrunning condition.

Also, as shown in FIG. 5A, the recoverable power may typically be less than the power output that the engine provides into the system. Thus, the recoverable power may not need to be stored in the system to increase machine energy efficiency. The energy may come into the system from an actuator and may be directed to the engine providing energy into the system.

Figure 5B:
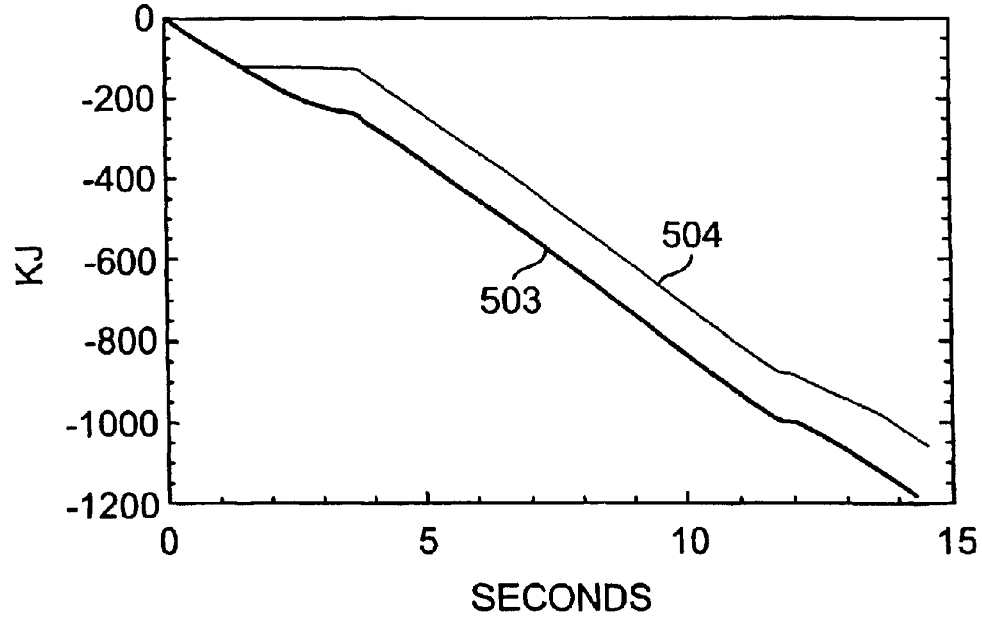
FIG. 5B is a graphical representation of a total energy output of a power source of the machine under the simulated operation of FIG. 5A with and without the energy recovery system according to one embodiment of this invention.

FIG. 5B illustrates a total simulated energy output of the power source in kJ with and without an energy recovery system according to one embodiment of this invention. A trace 503 illustrates the simulated total energy output without the energy recovery system. As shown in the trace 503, this operation requires the total energy of approximately–1200 kJ for this operation. A trace 504 shows the simulated total energy output with an energy recovery system. As shown in the trace 504, the total energy output with the energy recovery system is approximately–1050 kJ, thereby resulting in about 12% more energy efficiency. Under the overrunning load condition, the trace 504 becomes substantially level as energy is recovered from the actuator. When energy is being recovered under the overrunning load condition, the power supplied by the power source may be reduced or may not be required, and the total power output may not change as indicated by the substantially level part of the graph in FIG. 5A. Having discussed generally the energy efficiencies achieved through the disclosed energy recovery systems, the operation of each of the three disclosed embodiments will now be discussed.

Referring to FIG. 1, the control unit 44 senses an overrunning load condition in the hydraulic circuit based on the forces of the hydraulic actuator 22 monitored by the pressure sensors 42 and the operating command of the hydraulic actuator. For example, when the force in the head end actuating chamber 26 is higher than the force in the rod end actuating chamber 28 and the piston 30 is commanded to extend, the control unit 44 senses that the system is operating to lift the load. On the other hand, when the force in the head end actuating chamber 26 is higher than the force in the rod end actuating chamber 28 and the piston 30 is commanded to be retracted, then the system is operating under the overrunning load condition.

In the system 10 having the IMV shown in FIG. 1, to lift the load under the non-overrunning load condition, the second independently operable valve 39 opens to place the pump 12 and the head end actuating chamber 26 of the cylinder 22 in fluid communication, and the third independently operable valve 40 opens to place the rod end actuating chamber 28 of the cylinder 22 and the reservoir 20 in fluid communication.

The power source supplies torque and rotational speed to the pump 12. The swashplate of the pump 12 is set to the non-over-center position, and the pump 12 functions as a pump directing flow from the inlet port 19 to the outlet port 18. The displacement of the pump can be adjusted to meet the desired cylinder speed.

When the system senses the overrunning load condition, the system 10 operates in an energy recovery mode. Once the load is determined to be overrunning, the first and second independently operable valves 38, 39 are fully opened and the third and fourth independently operable valves 40, 41 are fully closed. The valve 25 is now actuated to provide the fluid from the hydraulic cylinder 22 to the pump 12 under the overrunning load condition. Opening the first and second independently operable valves 38, 39 turns the cylinder 22 into a pressure intensifier resulting in a higher pressure between the pump 12 and the valve 25. This pressure intensification also lowers the fluid flow rate from the valve 25 to the pump 12 and the piston 30 can be retracted at a desired speed.

When the overrunning load condition is sensed, the swashplate of the pump 12 is swiveled to the over-center position to direct the flow from the outlet port 18 to the inlet port 19. This swashplate swiveling action can be controlled by the control unit 44. The intensified fluid pressure from the cylinder 22 drives the motor and produces a torque output from the motor. The torque output is then supplied to the power source and can be used to drive other systems in the machine, such as a transmission, an alternator, fans, etc. The power source 14 can be electronically commanded to control the output. With the torque output supplied by the motor in the energy recovery mode, the power source may be controlled to optimize its efficiency by reducing, for example, fuel, consumption.

The speed of the piston movement in the hydraulic cylinder 22 is a function of the motor displacement, engine speed, and cylinder areas. Thus, to stop the piston 30, the swashplate of the pump 12 may be swiveled back to a neutral angle or a small pump angle, and the first and second independently operable valves 38, 39 may be closed.

If the overrunning load condition comes to an abrupt stop and the swashplate of the pump 12 is still set at the over-center position, a system can potentially fail. When the piston 30 of the cylinder 22 comes to a sudden stop, the fluid is no longer supplied from the cylinder 22 to the pump 12. However, because the power source 14 continues to turn the pump 12, which is over center, sufficient fluid may not be supplied to the outlet port 18. This situation may occur, for example, when a bucket of a wheel loader or excavator is lowered and hits the ground.

To alleviate this problem, the system 10 shown in FIG. 1 supplies fluid to the hydraulic circuit when fluid pressure in the hydraulic circuit reaches a fluid supply pressure. When the cylinder 22 abruptly stops and the lack of fluid to the pump 12 results in a pressure drop in the conduit 24 such that a fluid supply pressure is reached, the check valve 48 opens and the fluid from the reservoir 20 may be supplied to the conduit 24. At the same time, the control unit 44 may sense this drop in pressure and control the swashplate of the pump 12 to swivel back to the non-over-center position. The fourth independently operable valve 41 may be used to control the cylinder 22 as the swashplate of the pump 12 swivels back.

In another exemplary embodiment shown in FIG. 2, the system 100 may accumulate the fluid from the hydraulic circuit in the accumulator 120 prior to supplying the fluid in the hydraulic circuit. During the normal or non-energy-recovery operation, the supply valve 118 is set at the first valve position 122 to receive the fluid from the conduit 24 to the accumulator 120. When the fluid pressure in the accumulator 120 reaches a desired pressure, the supply valve 118 is moved to the second valve position 124 and the fluid pressure in the accumulator 120 is maintained at a certain pressure. If the fluid pressure in the conduit 24 drops to the fluid supply pressure, the check valve in the second valve position 124 opens to supply the fluid from the accumulator 120 to the conduit 24 until the swashplate of the pump 12 swivels back to the normal position.

In the exemplary embodiments shown in FIGS. 2 and 3, the first valve 102 is set at the first valve position 104 during the normal operation. To keep the piston 30 stationary, the second valve 103 is set at the second valve position 112. When the piston 30 is to be extended, the second valve 103 is set at the first valve position 110. When the piston 30 to be retracted, the second valve 103 is set at the third valve position 114. When the overrunning load condition is sensed, the first valve 102 is moved to the second valve position 106 to supply the fluid back to the pump 12 in FIG. 2 or to the motor 204 in FIG. 3.

Referring to FIG. 3, an overrunning load condition in the hydraulic circuit is sensed by the control unit 44. The first valve 102 is actuated to provide fluid from the hydraulic actuator 22 to the motor 204 under the overrunning load condition. A torque output is produced from the fluid provided to the motor 204. This torque is then provided to the power source 14.

The power source 14 is coupled to the pump 202 by the drive shaft 16 and to the motor 204 by the shaft 16 or a different shaft. When the power source rotates the first rotatable clutch element 208 in the counter-clockwise direction in FIG. 4 and the second rotatable clutch element 210 is stationary, the first and second rotatable clutch elements 208, 210 do not engage. When the second rotatable clutch element 210 starts to rotate under the overrunning load condition and tries to rotate faster in the counter-clockwise direction than the first rotatable clutch element 208 is rotating in the counter-clockwise direction, the two clutch elements engage, and the torque output from the motor 204 is transmitted to the power source 14.

The above described method and system effectively recovers energy in a hydraulic circuit. Moreover, the described system recovers energy in a cost effective and energy efficient manner, while avoiding damage to components within the system.

It will be apparent to those skilled in the art that various modifications and variations can be made in the system and method of the present invention without departing from the scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for recovering energy in a hydraulic circuit including a pump having a swashplate and being in fluid communication with a hydraulic actuator via a valve, the method comprising:

sensing an overrunning load condition in the hydraulic circuit;

actuating the valve to provide fluid from the hydraulic actuator to the pump under the overrunning load condition;

producing a torque output from the fluid provided to the pump; and supplying fluid to the hydraulic circuit when the overrunning load condition ends and fluid pressure in the hydraulic circuit reaches a fluid supply pressure.

2. The method of claim 1, further including accumulating the fluid from the hydraulic circuit in a chamber prior to supplying the fluid to the hydraulic circuit.

3. The method of claim 1, wherein the overrunning load condition sensing step includes monitoring a pressure of the hydraulic actuator and an operating command of the hydraulic actuator.

4. The method of claim 1, wherein the hydraulic actuator is operated as a pressure intensifier when the overrunning load condition is sensed.

5. The method of claim 1, wherein the torque producing step includes tilting the swashplate of the pump to an over-center position so that the pump functions as a motor.

6. The method of claim 5, wherein the swashplate of the pump is tilted to the over-center position when the overrunning load condition is sensed.

7. The method of claim 5, further including tilting the swashplate of the pump from the over-center position to a non-over-center position when the overrunning load condition ends so that the pump functions as a pump.

8. The method of claim 1, wherein the pump is coupled to a power source, and further including transferring the produced torque output to the power source.

9. The method of claim 8, further including controlling the power source to optimize efficiency of the power source.

10. A method for recovering energy in a hydraulic circuit including a pump and a motor in fluid communication with a hydraulic actuator via a valve, the method comprising:

sensing an overrunning load condition in the hydraulic circuit;

actuating the valve to provide fluid from the hydraulic actuator to the motor under the overrunning load condition; and producing a torque output from the fluid provided to the motor.

11. The method of claim 10, wherein the overrunning load condition sensing step includes monitoring pressure and an operating command of the hydraulic actuator.

12. The method of claim 10, wherein the hydraulic actuator is operated as a pressure intensifier when the overrunning load condition is sensed.

13. The method of claim 12, wherein the torque is provided from the motor to the power source via a one-way clutch.

14. The method of claim 10, further including providing the produced torque to a power source.

15. The method of claim 14, wherein the one-way clutch engages and disengages a motor output shaft and a power source output shaft.

16. The method of claim 15, wherein the one-way clutch engages the motor and the power source when the motor output shaft drives the power source output shaft.

17. The method of claim 15, wherein the one-way clutch disengages the motor and the power source when the motor output shaft rotates slower than the power source output shaft.

18. The method of claim 15, further including transferring the produced torque output to the power source when the motor is engaged with the power source.

19. The method of claim 18, further including controlling the power source to optimize efficiency of the power source.

20. A system for recovering energy in a hydraulic circuit, comprising:

a pump having a swashplate tiltable to direct flow between a valve and a reservoir;

a hydraulic actuator in fluid communication with the pump via the valve and a conduit, the valve being configured to provide fluid from the hydraulic actuator to the pump under an overrunning load condition;

a sensor assembly in communication with the hydraulic circuit;

a control unit electrically coupled to the valve and the sensor and assembly; and a fluid supply valve in fluid communication with the pump, the fluid supply valve being configured to open to supply fluid to the conduit when the overrunning load condition ends and fluid pressure in the conduit reaches to a fluid supply pressure.

21. The system of claim 20, wherein the fluid supply valve is a check valve in fluid communication with the conduit and the reservoir.

22. The system of claim 20, further including an accumulator and wherein the fluid supply valve is a second valve in fluid communication with the conduit and the accumulator.

23. The system of claim 22, wherein the second valve includes first and second valve positions, the first valve position being configured to supply the fluid from the conduit to the accumulator, the second valve position being configured to supply the fluid in the accumulator to the conduit.

24. The system of claim 20, wherein the swashplate of the pump is tilted to an over-center position so that the pump functions as a motor.

25. The system of claim 24, wherein the swashplate of the pump is tilted to the over-center position under the overrunning load condition.

26. The system of claim 24, wherein the swashplate of the pump is tilted from the over-center position to a non-over-center position when the overrunning load condition ends so that the pump functions as a pump.

27. The system of claim 20, wherein the hydraulic actuator is a hydraulic cylinder.

28. The system of claim 20, herein the valve is an independent metering valve assembly.

29. The system of claim 20, wherein the valve includes first and second valve positions, the first valve position being configured to supply the fluid from the pump to the hydraulic actuator, the second valve position being configured to supply the fluid from the hydraulic actuator to the pump.

30. The system of claim 20, wherein the sensor assembly includes a plurality of pressure sensors that monitor pressure of the hydraulic actuator.

31. The system of claim 30, wherein the control unit monitors an operating command of the hydraulic actuator and senses the overrunning load condition based on the operating command and the monitored pressure of the hydraulic actuator.

32. The system of claim 20, wherein the pump is coupled to a power source, the pump providing a torque output to the power source under the overrunning load condition.

33. A system for recovering energy in a hydraulic circuit, comprising:

a pump;

a hydraulic actuator in fluid communication with the pump via a valve and a conduit;

a motor in fluid communication with the hydraulic actuator via the valve, the valve being configured to provide fluid from the hydraulic actuator to the motor under an overrunning load condition;

a sensor assembly in communication with the hydraulic circuit; and a control unit electrically coupled to the valve and the sensor assembly.

34. The system of claim 33, wherein the hydraulic actuator is a hydraulic cylinder.

35. The system of claim 33, wherein the valve is an independent metering valve assembly.

36. The system of claim 33, wherein the valve includes first and second valve positions, the first valve position being configured to supply the fluid from the pump to the hydraulic actuator, the second valve position being configured to supply the fluid from the hydraulic actuator to the motor.

37. The system of claim 33, wherein the sensor assembly includes a plurality of pressure sensors that monitor pressure of the hydraulic actuator.

38. The system of claim 33, wherein the control unit monitors an operating command of the hydraulic actuator and senses the overrunning load condition based on the operating command and the monitored pressure of the hydraulic actuator.

39. The system of claim 33, wherein the motor is configured to be coupled to a power source.

40. The system of claim 39, further including a one-way clutch, the motor being configured to be coupled to the power source via the one-way clutch.

41. The system of claim 40, wherein the one-way clutch includes a first rotatable clutch element coupled to the power source and a second rotatable clutch element coupled to the motor.

42. The system of claim 41, wherein the first and second rotatable clutch elements engage when the second rotatable clutch element drives the first rotatable clutch element.

43. The system of claim 41, wherein the first and second rotatable clutch elements disengage when the second rotatable clutch element rotates slower than the first rotatable clutch element.

* * * * *